(12) United States Patent
Dragoo et al.

(10) Patent No.: US 7,152,735 B2
(45) Date of Patent: *Dec. 26, 2006

(54) COVER FOR A RECYCLABLE CONTAINER

(75) Inventors: Robert K. Dragoo, St. Paris, OH (US);
David E. Shepherd, Sidney, OH (US);
Michael A. Rowland, St. Paris, OH (US)

(73) Assignee: Illinois Tool Works Inc., Glenview, IL (US)

( * ) Notice: Subject to any disclaimer, the term of this patent is extended or adjusted under 35 U.S.C. 154(b) by 75 days.

This patent is subject to a terminal disclaimer.

(21) Appl. No.: 10/195,743

(22) Filed: Jul. 15, 2002

(65) Prior Publication Data

US 2003/0192802 A1 Oct. 16, 2003

Related U.S. Application Data

(63) Continuation-in-part of application No. 10/119,463, filed on Apr. 10, 2002, now Pat. No. 7,017,742.

(51) Int. Cl.
*B65D 85/66* (2006.01)
*B65D 85/04* (2006.01)

(52) U.S. Cl. .............. 206/408; 206/410; 206/397; 206/409; 206/386

(58) Field of Classification Search .............. 206/409, 206/408, 395, 389, 396, 386, 397, 595–599; 242/170–172, 578, 578.1, 588.3, 588.4; 108/51.3, 56.1, 57.31, 57.33
See application file for complete search history.

(56) References Cited

U.S. PATENT DOCUMENTS

| | | | | |
|---|---|---|---|---|
| 2,610,812 A | * | 9/1952 | Epstein | 242/137.1 |
| 2,713,938 A | * | 7/1955 | Snyder | 206/395 |
| 2,974,850 A | * | 3/1961 | Louis | 206/409 |
| 3,156,354 A | * | 11/1964 | Laymon | 206/53 |
| 3,161,289 A | * | 12/1964 | Leysen | 206/395 |
| 3,249,320 A | * | 5/1966 | Frederick | 242/137.1 |
| 3,390,844 A | * | 7/1968 | Dillow et al. | 242/129 |
| 3,515,269 A | * | 6/1970 | Furtado | 206/409 |
| 3,602,455 A | * | 8/1971 | Lewis | 242/129 |
| 3,700,185 A | * | 10/1972 | Hubbard et al. | 242/159 |
| 3,784,055 A | * | 1/1974 | Anderson | 221/46 |
| 4,185,754 A | * | 1/1980 | Julius | 221/63 |
| 4,451,014 A | * | 5/1984 | Kitt et al. | 242/128 |
| 4,715,557 A | | 12/1987 | Rushing et al. | 242/129 |
| 4,718,633 A | | 1/1988 | Weixel | 242/129 |
| 4,869,367 A | | 9/1989 | Kawasaki et al. | 206/409 |

(Continued)

FOREIGN PATENT DOCUMENTS

EP 0 334 329 A2 3/1989

(Continued)

*Primary Examiner*—Jila M. Mohandesi
(74) *Attorney, Agent, or Firm*—Flectcher Yoder

(57) ABSTRACT

A removable cover for a container and a container having the removable cover. The cover may be adapted with an opening to enable wire to pass through the cover with the cover disposed on the container. The container may be adapted to be lifted by inserting a fork, or other lifting member, of a lifting device into the container. The container may comprise a fiber drum having one or more openings, or recesses, adapted to receive a fork of a lifting device. The container may be cylindrical. The container may be adapted to store wire. An adapter assembly may be disposed on the cover to protect the opening in the cover and to direct movement of the wire.

17 Claims, 4 Drawing Sheets

U.S. PATENT DOCUMENTS

| | | | |
|---|---|---|---|
| 5,277,314 A * | 1/1994 | Cooper et al. | 206/398 |
| 5,490,595 A | 2/1996 | Sakai et al. | 206/408 |
| 5,494,160 A | 2/1996 | Gelmetti | 206/395 |
| 5,595,304 A * | 1/1997 | Timmins | 206/598 |
| 5,709,301 A * | 1/1998 | Couch et al. | 206/361 |
| 5,743,461 A * | 4/1998 | Timmins | 229/125.39 |
| 5,758,834 A | 6/1998 | Dragoo et al. | 242/128 |
| 6,016,911 A * | 1/2000 | Chen | 206/395 |
| 6,354,487 B1 * | 3/2002 | Muise, Jr. | 229/125.28 |
| 6,715,608 B1 * | 4/2004 | Moore | 206/397 |
| 2001/0006184 A1 | 7/2001 | Ohike et al. | 228/33 |
| 2003/0019776 A1 | 1/2003 | Matsuguchi et al. | 206/443 |

FOREIGN PATENT DOCUMENTS

| | | |
|---|---|---|
| EP | 1 057 751 A1 | 12/2000 |
| GB | 1 216 909 | 3/1979 |

\* cited by examiner

FIG. 10
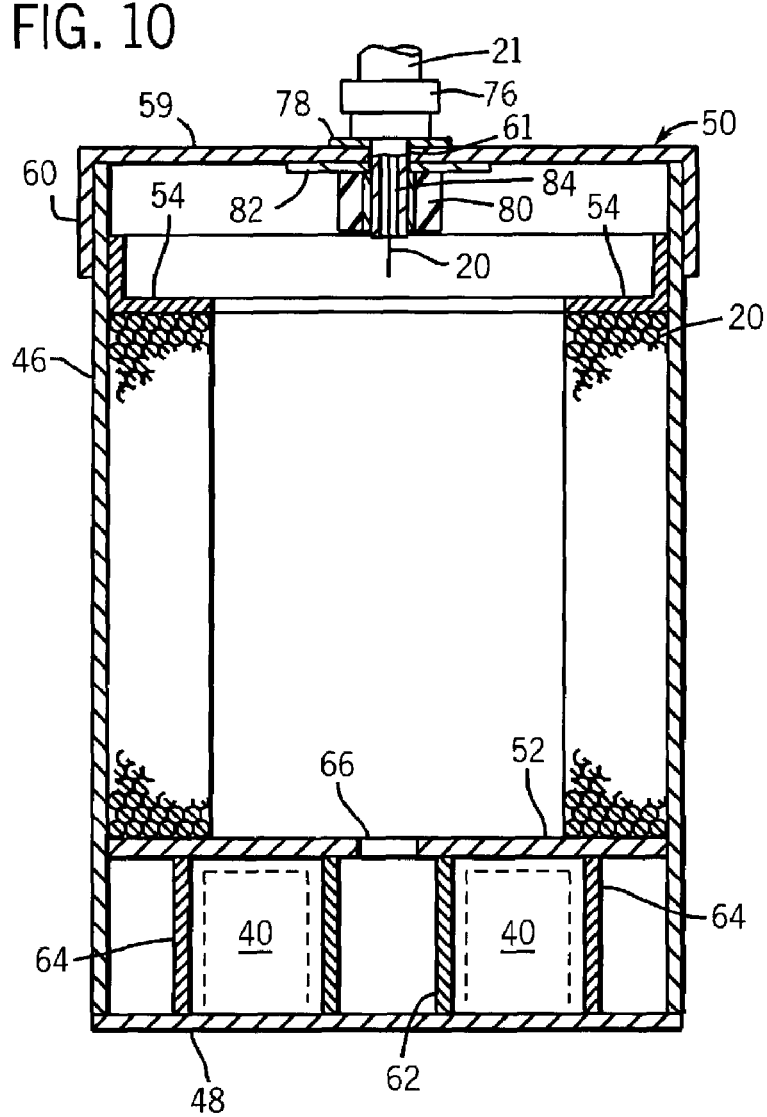
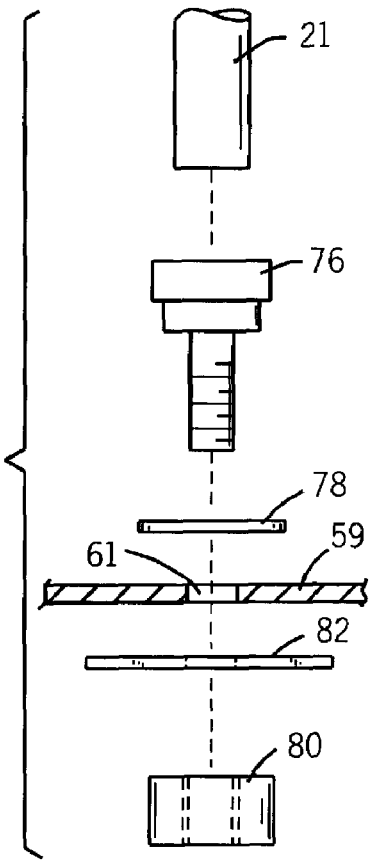
FIG. 10A

_COVER FOR A RECYCLABLE CONTAINER_

This application is a continuation-in-part of U.S. patent application Ser. No. 10/119,463, filed on Apr. 10, 2002 now U.S. pat. No. 7,017,742.

BACKGROUND OF THE INVENTION

The present invention relates generally to the field of containers, and more particularly to a recyclable container that is adapted for movement by a forklift, and that may be used to store welding wire and other materials.

Recyclable containers, such as fiber drums are used to store a variety of products and materials. For example, fiber drums may be used to store wire for use in an arc welding system. In some arc welding systems, such as MIG (Metal Inert Gas) welding systems, metal wire is used as an electrode to produce an arc. The welding wire also acts as filler material and is consumed during the welding process. Typically, the welding wire is fed from a wire feeder to a hand-held welding gun. A welding wire supplier may provide the welding wire to a customer in a fiber drum. A typical fiber drum used for storing welding wire is hollow and formed of a cellulosic material, such as paper or cardboard. In addition, a typical fiber drum has a metal band around the top to enable the fiber drum to be lifted by a device coupled to the metal band. In addition, special straps may be needed to move the fiber drum onto a pallet or to remove the fiber drum from the pallet. The weight of the fiber drums may make movement of the fiber drums difficult. Thus, the fiber drum is placed on a pallet when being moved. A forklift, or other lifting device may then move the pallet.

Once in position, the cover for the fiber drum is removed from the fiber drum. The cover for the fiber drum may be composed of metal or a cellulose material secured to the fiber drum by a metal ring. A conical payoff typically is placed atop the fiber drum after the cover is removed. The payoff serves as a funnel to guide the wire from the fiber drum to a conduit system. The conduit system, in turn, guides the wire to a welding machine. However, the payoffs are limited in their application to fiber drums having a corresponding size and shape. For example, a conical payoff may be used with a fiber drum having a round top, but may not be used on a fiber drum having an octagonal shape. In addition, the diameter of the payoff would have to correspond to the diameter of the fiber drum. A payoff could not be used with a given fiber drum if the diameter of the payoff was less than the diameter of the fiber drum. Furthermore, each payoff does has a certain cost that is associated with the payoff. This cost could be avoided if the payoff were not needed.

Fiber drums typically are discarded after the wire, or other material housed therein, is consumed because the fiber drums cannot easily be recycled. Recycling is difficult because the cellulosic portion of the drum must be separated from the metal portion of the drum to recycle either the fibrous portion or the metal portion. That operation can be complex and time consuming. Thus, a typical fiber drum owner ultimately pays to dispose of the empty fiber drum as refuse, rather than regaining some of the cost of the fiber drum by recycling.

Therefore, a need exists for a fiber drum that may be used to transport heavy materials, such as welding wire, and that is easier to move than conventional fiber drums. In addition, a need exists for a fiber drum that is recyclable, or that can be made recyclable with minimal time and effort. Furthermore, there is a continuous need for reducing the costs associated with manufacturing fiber drums.

SUMMARY OF THE INVENTION

The present invention provides a technique designed to respond to some or all of these needs. According to one aspect of the present technique, an apparatus for storing materials, such as welding wire, is featured. The container may be adapted to be lifted by inserting a portion of a lifting device into a hole or recess in the container. The container may comprise a fiber drum having one or more openings adapted to receive a fork of a lifting device. The container may be cylindrical and have a false bottom to support the welding wire. The container may be comprised of a cellulosic material. The container may house welding wire. The container may comprise a cover adapted to guide welding wire from the container to a conduit system without the use of a payoff.

According to another aspect of the present technique, a method of manufacturing a container adapted to be lifted by inserting a member of a lifting device into the container is featured. The method may comprise adapting a cylindrical fiber drum with an opening operable to receive at least one member of a lifting device. The method also may comprise disposing a false bottom into the container to support the contents, such as welding wire, above the opening in the fiber drum. The method may comprise adapting a container cover to guide welding wire from the container to a conduit system.

BRIEF DESCRIPTION OF THE DRAWINGS

The foregoing and other advantages and features of the invention will become apparent upon reading the following detailed description and upon reference to the drawings in which:

FIG. 10 is a cross-sectional view of the fiber drum of FIG. 1, taken generally along line 10—10 of FIG. 1; and FIG. 10A is an exploded view of the fiber drum and adapter assembly, according to an exemplary embodiment of the present technique.

DETAILED DESCRIPTION OF SPECIFIC EMBODIMENTS

Figure 1:
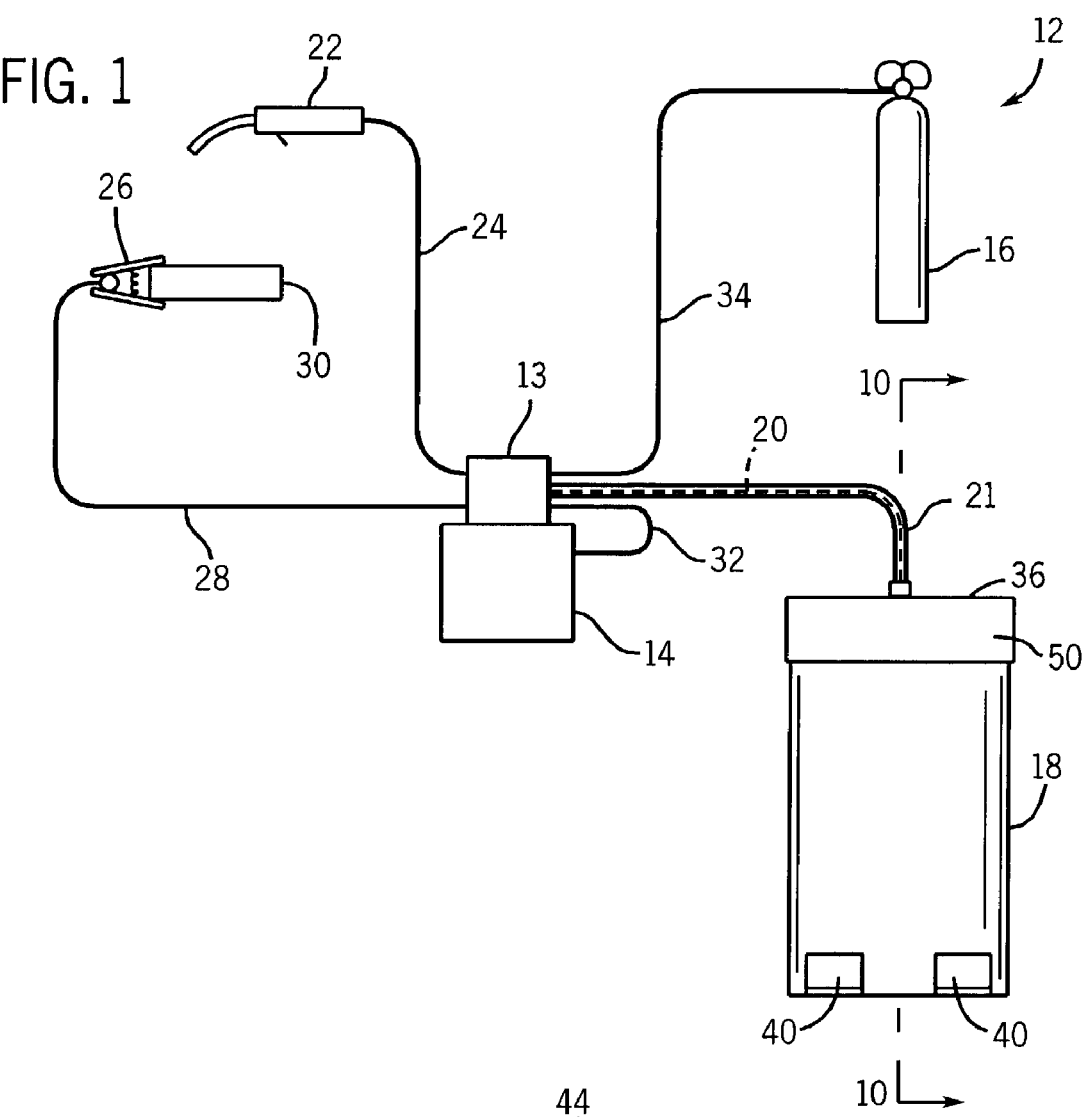
FIG. 1 is a diagrammatical view of a wire welding system, according to an exemplary embodiment of the present technique.

Referring generally to FIG. 1, a wire-welding system 12, such as a MIG welding system, is featured. In the illustrated embodiment, wire-welding system 12 comprises a wire feeder 13, a power source 14, a gas cylinder 16 and a recyclable container 18 containing welding wire 20. Preferably, the recyclable container 18 is comprised of a fibrous material, such as cellulosic paper, paperboard, or cardboard.

The power source 14 provides electricity to the wire feeder 13; the gas cylinder 16 provides inert gas to the wire feeder 13; and the container 18 provides welding wire 20 to the wire feeder 13 via a conduit system 21. In the illustrated embodiment, the wire feeder 13 provides electricity, welding wire 20, and inert gas to a welding torch 22. The wire, gas, and electricity are coupled to the torch 22 by a welding cable 24. In addition, a work clamp 26 is coupled to the wire feeder 13 by a ground cable 28. The work clamp 26 is secured to a workpiece 30 to electrically couple the workpiece 30 to the wire feeder 13. The torch 22 controls the operation of the system 12. When the torch 22 is activated, welding wire 20 is fed through the torch 22 by the wire feeder 13. When the welding wire 20 contacts the workpiece 30, an electrical circuit between the workpiece 30 and the wire feeder 13 is completed and an electric arc is produced. The electric arc melts the workpiece 30 and welding wire 20 at the point of contact. The inert gas shields the molten area from contaminants. A power cable 32 conducts electricity from the power source 14 to the wire feeder 13. A hose 34 channels gas from the gas cylinder 16 to the wire feeder 13.

In the illustrated embodiment, the container 18 is a hollow, generally cylindrical fiber drum. However, the container 18 may have a shape other than a cylindrical shape. For example, the container 18 may be square, hexagonal, octagonal, etc. A spool of welding wire is disposed within the hollow interior of the fiber drum 18.

Figure 2:
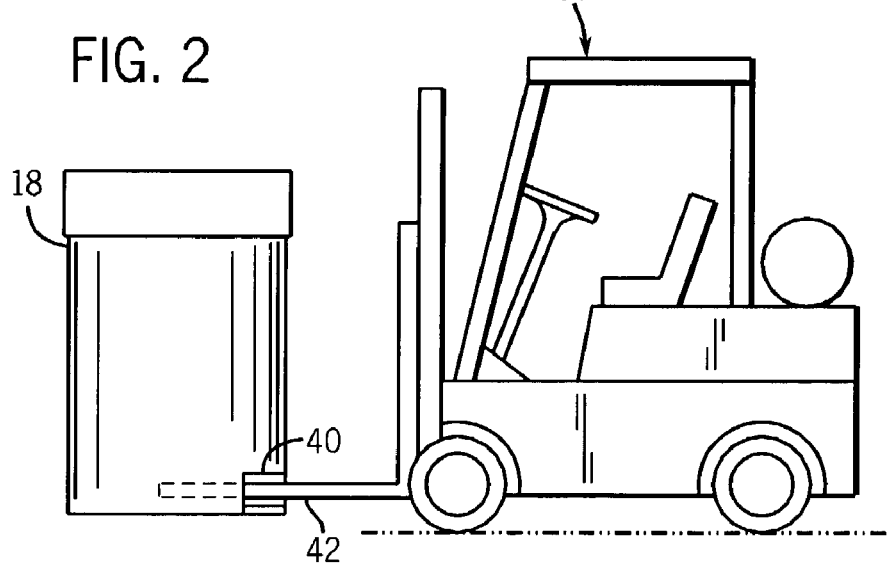
FIG. 2 is an elevational view illustrating the lifting of a fiber drum by a forklift, according to an exemplary embodiment of the present technique.

In the illustrated embodiment, the fiber drum 18 has at least one, and as illustrated, a plurality of holes, or recesses, 40 located on a bottom portion of the fiber drum 18. As best illustrated in FIG. 2, the fiber drum 18 is adapted to enable the forks 42 of a forklift 44, or other member of a lifting device, to enter one or more of the plurality of holes, or recesses, 40 and be positioned below the welding wire 20 to lift the fiber drum 18. In the illustrated embodiment, two holes 40 are used, one for each fork 42 of the forklift 44. However, the fiber drum 18 also may be adapted with a single hole, or recess, that enables two forks 42, or a single lifting member to enter the fiber drum 18. In addition, exit holes may be provided to enable the forks 42 to extend through the fiber drum 18. Furthermore, a lifting device other than a forklift 44 may be used to lift the fiber drum 18 via one or more of the holes 40, or other (i.e. open) recesses. For example, lifting straps could be passed through the openings to enable an overhead crane to lift the container 18. Other lifting devices may also be used.

Figure 3:
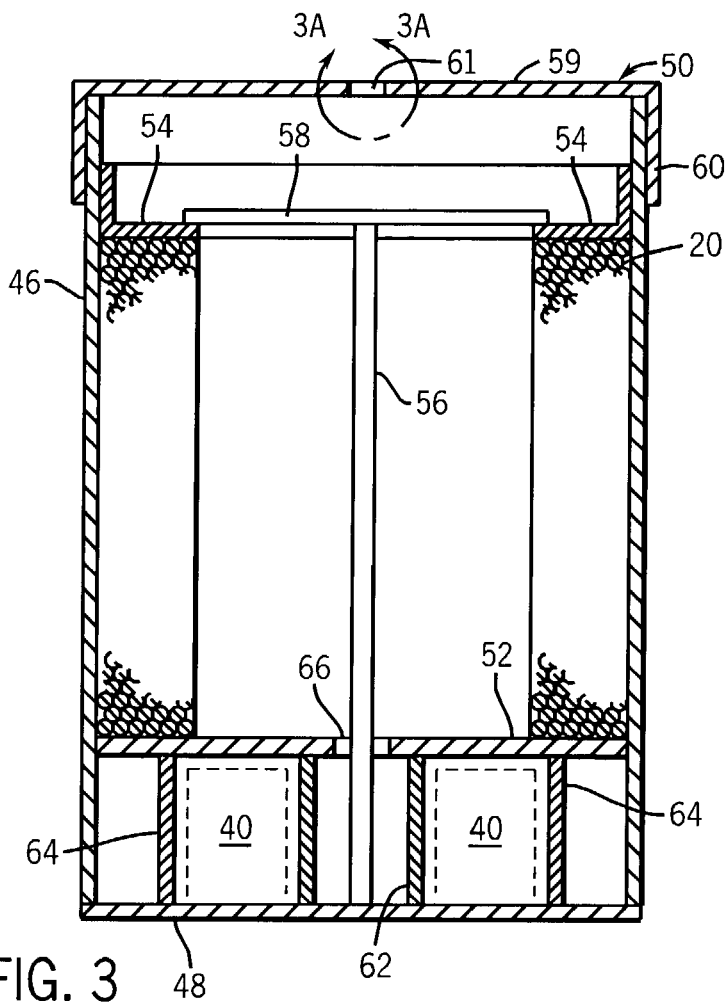
FIG. 3 is a cross-sectional view of a fiber drum adapted for shipping.

Referring generally to FIG. 3, an exemplary embodiment of a fiber drum 18 adapted for shipping is illustrated. In the illustrated embodiment, the fiber drum 18 has a cylindrical portion 46, a bottom 48, a lid 50, and a false bottom 52. The false bottom 52 is placed within the cylindrical portion 46 and the welding wire 20 is then placed atop the false bottom 52. A removable ring 54 is floated atop the spool of wire 20 to guide the wire 20 as it is unwound from the spool. Prefereably, the removable ring 54 is made of metal. An elastic strap 56 and metal rod 58 are used to drive the metal ring 54 downward to secure the welding wire 20 within the cylindrical housing 46 during transport. The rod 58 may be removed from the fiber drum 18 when the drum is placed in service. The elastic strap 56 also may be removed at this time. The ring 54 is removed when the wire 20 has been consumed.

Figure 3A:
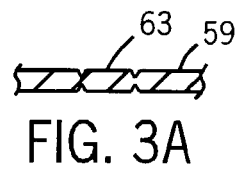
FIG. 3A is a detailed view of an alternative embodiment of the cover, as taken generally along line A—A of FIG. 3.
Figure 3B:
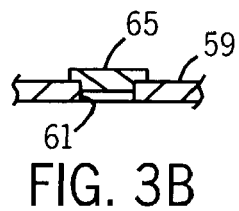
FIG. 3B is a detailed view of a second alternative embodiment of the cover, as taken generally along line A—A of FIG. 3.

In the illustrated embodiment, the cylindrical portion 46, bottom 48, cover 50, and false bottom 52 are composed of a fibrous material, such as cellulosic paper, paperboard, or cardboard. In the illustrated embodiment, the cover 50 has a top portion 59 and a skirt portion 60. The top portion has an opening 61 therethrough to enable welding wire 20 to pass through the cover 50. The opening 61 may be a hole, as shown in FIG. 3, or a notch located on the periphery of the cover 50. As illustrated in FIG. 3A, the cover 50 may be adapted with a punch-out 63 to enable a customer to form the opening 61 by punching the punch-out 63 through the top portion 59 of the cover 50. The punch-out 63 may be formed in a number of ways. For example, a press may be used to press a circular pattern into the top portion of the cover 50. The circular pattern of the cover 50 is weaker than the cover 50, causing the cover 50 to tear at the circular pattern when a sufficient force is applied to the center of the circular pattern. Alternatively, as illustrated in FIG. 3B, a plug 65 or insert may be placed over the hole 61 during shipment to prevent debris or other objects from entering the container.

In the illustrated embodiment, the cover 50 is held in position on the housing 46 by friction between the skirt portion 60 of the cover and the cylindrical portion of the fiber drum 18. However, a strap or other device may be used to further secure the cover 50 to the housing 46. In addition, in this embodiment, the cylindrical housing 46, bottom 48, cover 50, and false bottom 52 are adapted to be free of metal so that they may be more readily recycled once the welding wire has been consumed. The metal ring 54 and metal rod 58 may be recycled as metal once they are removed from the fiber drum 18.

Figure 5:
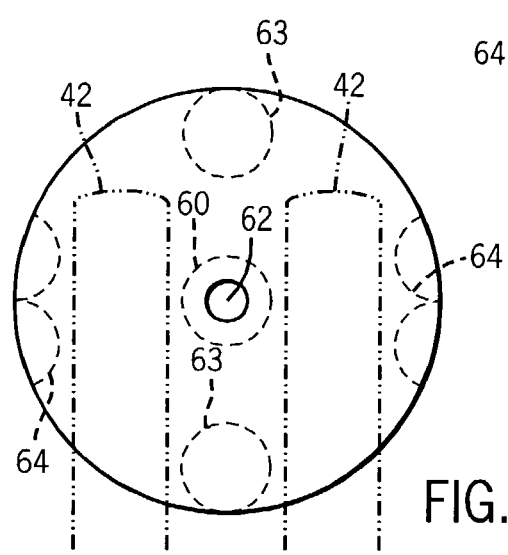
FIG. 5 is a top view of the false bottom of FIG. 4, according to an exemplary embodiment of the present technique.
Figure 4:
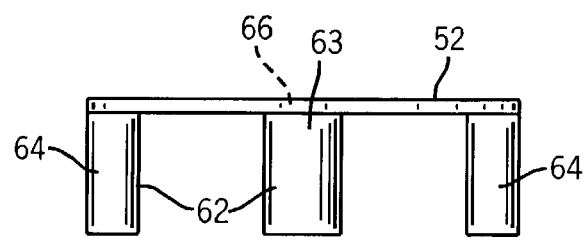
FIG. 4 is an elevational view of a false bottom for a fiber drum, according to an exemplary embodiment of the present technique.

Referring generally to FIGS. 4 and 5, a plurality of supports 62 are secured to the false bottom 52. The plurality of supports 62 and false bottom 52 are adapted to support the welding wire 20 above the bottom to provide clearance for the forks 42 of the forklift 44 to enter the fiber drum 18 below the wire 20. In the illustrated embodiment, the supports 62 also are adapted from cellulosic cylinders, such as cardboard tubing. However, the supports 62 may be comprised of another suitable material. In this embodiment, there are circular supports 63 and semi-circular supports 64. The semi-circular supports 64 may be adapted from the circular supports 63, for example, by cutting them in half lengthwise. Preferably, the supports 62 are secured, such as by glue, to the bottom 48 and the false bottom 52. The false bottom 52 also may be secured to the cylindrical portion 46 of the fiber drum 18. Furthermore, rather than using a false bottom 52 and the plurality of holes 40, the fiber drum 18 may be adapted with the supports 62 secured to the bottom 48 of the fiber drum 18 from below, rather than from above, to create a space for the forks 42, or another lifting member, to be positioned below the bottom 48 of the fiber drum 18.

In the illustrated embodiment, the false bottom 52 has a hole 66 to enable the elastic strap 56 to pass through the false bottom 52. Furthermore, the cylindrical housing 46, bottom 48, false bottom 52, and supports 62 are adapted to be free of metal so that they may be more readily recycled as a fibrous material once the welding wire has been consumed. The metal ring 54 and metal rod 58 may be recycled as metal once they are removed from the fiber drum 18.

Figure 6:
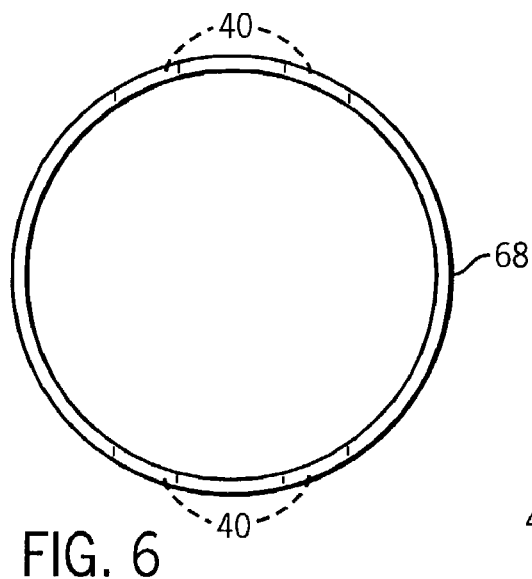
FIG. 6 is a top view of an alternative embodiment of a fiber drum, according to an exemplary embodiment of the present technique.

Referring generally to FIG. 6, an alternative embodiment of a fiber drum 68 is illustrated. In the embodiment illustrated, a second plurality of holes 40 are provided opposite the first plurality of holes 40 to enable the forks to extend through the fiber drum 18 and to enable the forks to enter the fiber drum from a second orientation.

Figure 7:
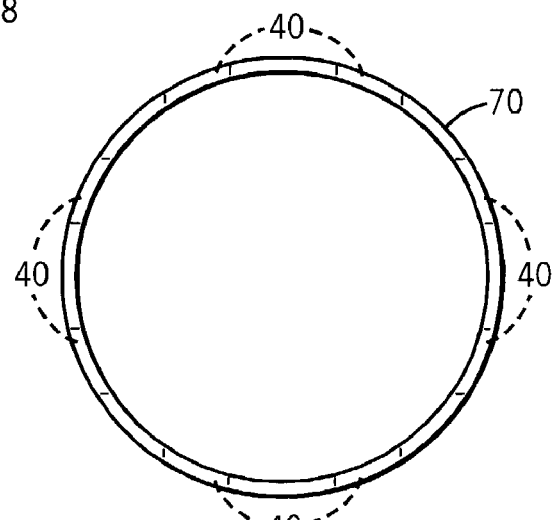
FIG. 7 is a top view of a second alternative embodiment of a fiber drum, according to an exemplary embodiment of the present technique.

Referring generally to FIG. 7, a second alternative embodiment of a fiber drum 70 is illustrated. In the illustrated embodiment, there are four pairs of holes disposed in fiber drum 70, one pair in each quadrant. The plurality of holes 40 enable the forks 42 to enter the fiber drum 70 from four directions.

Figure 8:
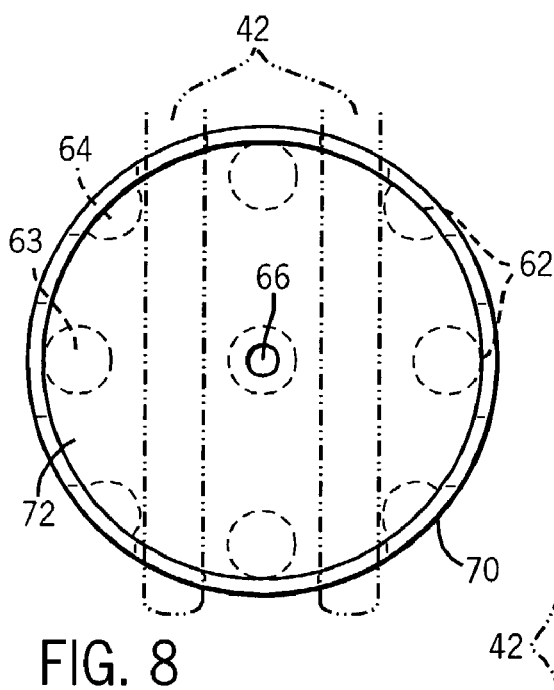
FIG. 8 is a top view of the fiber drum of FIG. 7 and an alternative embodiment of a false bottom, illustrating the insertion of forks into the fiber drum from a first direction, according to an exemplary embodiment of the present technique.
Figure 9:
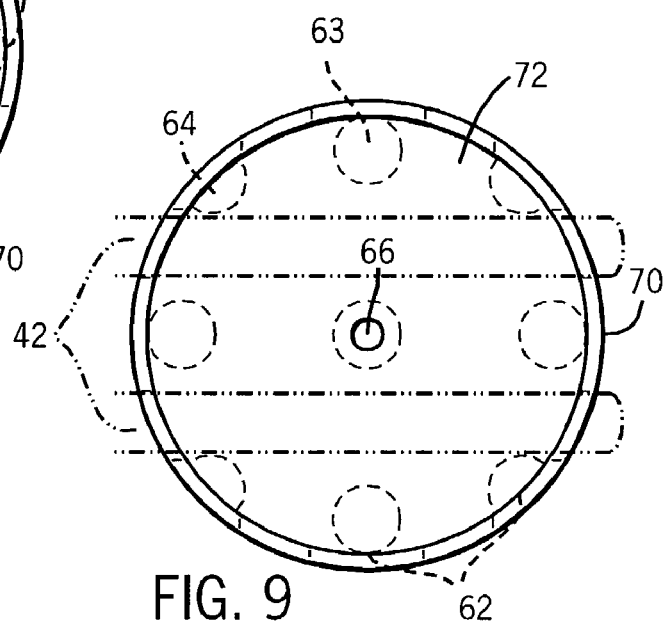
FIG. 9 is a top view of the fiber drum of FIG. 7 and an alternative embodiment of a false bottom, illustrating the insertion of forks into the fiber drum from a second direction, according to an exemplary embodiment of the present technique.

Referring generally to FIGS. 8 and 9, an alternative embodiment of a false bottom 72 disposed within the fiber drum 70 is featured. The false bottom 72 is adapted to be aligned with the plurality of holes 40 to provide clearance for the forks 42 to enter the fiber drum 70 from each of four directions around the fiber drum 70.

The illustrated embodiments of fiber drums described above enable the metal portions of the fiber drums to be easily separated from the non-metal portions of the fiber drums, thus enabling the fiber drums to be recycled easily. In addition, the fiber drums described above are easily moved by standard lifting devices, such as forklifts, without the need of special lifting straps or pallets.

Referring generally to FIG. 10, a cross-sectional view of the fiber drum of FIG. 1 is illustrated. A conduit adapter assembly 74 is secured to cover 50 to couple the cover 50 and the conduit system 21. The conduit adapter assembly 74 is inserted through hole 61 in the cover 50. The conduit adapter assembly 74 is adapted to guide wire 20 from the fiber drum 18 into the conduit system 21.

As best illustrated in FIG. 10A, the conduit adapter assembly 74 comprises a quick-disconnect 76, a washer 78, a wire guide 80, and a plate 82. The quick-disconnect 76 and wire guide 80 are adapted to secure to each other through the hole 61 in the top portion 59 of the cover 50 and through holes in the washer 78 and plate 82, respectively. The quick-disconnect 76 and wire guide 80 form a path 84 for welding wire 20 to pass through the hole 61 in the fiber drum 18. The conduit adapter assembly 74 thereby guides the wire into the conduit system 21 and protects the cover 50 of the fiber drum 18 from damage due to abrasion from the welding wire 20. In addition, the quick-disconnect 76 is adapted to be quickly connected to or disconnected from the conduit system 21. Furthermore, the washer 78 and plate 82 distribute stress caused by the conduit adapter assembly 74 over a larger area of the top portion 59 of the cover 50.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims. For example, the holes in the cylindrical portion and the supports may be arranged in a myriad of orientations to enable the fiber drum to be lifted from a number of different orientations. In addition, the holes in the cylindrical portion of the container may be adapted to receive a lifting member other than the forks of a forklift.

What is claimed is:

1. A welding wire and container assembly, comprising:
   a housing consisting essentially of a recyclable material, the housing comprising:
   a planar base;
   a wall having an upper edge and a lower edge engaging the base, wherein the base and the wall define exterior peripheral surfaces of the housing;
   a planar false bottom disposed within the wall between the upper edge of the wall and the base, wherein the false bottom is circumscribed by the wall; and
   a plurality of support structures, each support structure being in abutment with the base and the false bottom to support the false bottom;
   wherein the support structures are spaced from one another between the base and the false bottom such that the false bottom, the base, and external peripheral surfaces of the support structures define passageways configured to receive forks of a forklift, wherein the wall includes at least one aperture for access to the passageways to receive the forks, and wherein the base, the wall, the false bottom, and the support structures comprise similar recyclable materials;
   a coil of welding wire disposed in the housing and on the false bottom; and
   a cover having a top surface having a hole extending therethrough, and a skirt askew to the top surface, wherein the skirt frictionally engages the wall to secure the cover to the housing.

2. The welding wire and container assembly as recited in claim 1, wherein the recyclable material comprises a cellulosic material.

3. The welding wire and container assembly as recited in claim 1, wherein the recyclable material comprises a fibrous material.

4. The welding wire and container assembly as recited in claim 1, wherein the hole in the top surface of the cover comprises a removable protective fitting configured to couple with the cover, wherein the removable protective fitting comprises a wire passage configured to generally align with the opening.

5. The welding wire and container assembly as recited in claim 4, wherein the removable protective fitting comprises threaded members that couple together about the cover, at least one of the threaded members extending through the opening.

6. The welding wire and container assembly as recited in claim 4, wherein the removable protective fitting comprises a conduit connector configured to connect the removable protective fitting to a conduit system.

7. The welding wire and container assembly as recited in claim 4, wherein the removable protective fitting comprises opposite members disposed about the cover and removably coupled together.

8. The welding wire and container assembly as recited in claim 4, wherein the removable protective fitting comprises:
   a quick-disconnect disposed at least partially outside of the housing and the cover and adapted to couple with a wire conduit outside of the housing and the cover, the quick-disconnect having a threaded portion; and a wire guide disposed at least partially inside of the housing and the cover, the wire guide having a complementary threaded portion adapted to engage the threaded portion of the quick-disconnect.

9. The welding wire and container assembly as recited in claim 1, wherein the hole in the cover comprises:
a wire feed opening; and
a conduit adapter configured to couple with the cover in substantial alignment with the wire feed opening, wherein the conduit adapter comprises a quick-disconnect adapted to couple with a wire conduit outside of the housing and the cover.

10. The welding wire and container assembly as recited in claim 9, comprising the wire conduit.

11. The welding wire and container assembly as recited in claim 1, wherein the housing has an outer right cylindrical surface, and wherein the cover is round and has a skirt having a right cylindrical inner surface configured to be disposed about the outer right cylindrical surface.

12. The welding wire and container assembly as recited in claim 1, wherein the cover comprises a second cover adapted to form a barrier across the hole.

13. The welding wire and container assembly as recited in claim 12, wherein the second cover comprises a punch-out portion of the cover to block the hole.

14. The welding wire and container assembly as recited in claim 1, comprising an elastic band secured to the housing, wherein the elastic band is configured to draw a wire restraining member towards the housing to restrain movement of the coil of welding wire disposed within the housing.

15. The welding wire and container assembly as recited in claim 1, comprising a welding system configured to receive welding wire from the coil of welding wire disposed in the housing.

16. The welding wire and container assembly as recited in claim 15, wherein the welding system comprises a wire feeder, or a power source, or a gas supply container, or a torch, or a conduit system, or a combination thereof.

17. The welding wire and container assembly as recited in claim 15, wherein the welding system comprises a metal inert gas welding system.

* * * * *